United States Patent [19]

Petit

[11] Patent Number: 5,076,214
[45] Date of Patent: Dec. 31, 1991

[54] BIRD FEEDER

[76] Inventor: Constance J. Petit, Aunt Hack Rd., Danbury, Conn. 06811

[21] Appl. No.: 557,320

[22] Filed: Jul. 23, 1990

[51] Int. Cl.$^5$ .................... A01K 39/01; A01K 5/015
[52] U.S. Cl. ............................. 119/51.03; 119/57.8
[58] Field of Search .................. 119/51.03, 18, 57.8, 119/57.9, 70

[56] References Cited

U.S. PATENT DOCUMENTS

| | | | |
|---|---|---|---|
| 2,591,126 | 4/1952 | Breck, Jr. | 119/52.2 |
| 2,709,985 | 6/1955 | Clauson | 119/51.03 X |
| 2,908,250 | 10/1959 | Aniser | 119/51.03 |
| 2,961,994 | 11/1960 | Kopietz | 119/51.03 |
| 2,984,208 | 5/1961 | Kopietz | 119/51.03 |

FOREIGN PATENT DOCUMENTS

| | | | |
|---|---|---|---|
| 0125078 | 8/1947 | Australia | 119/51.03 |
| 343360 | 10/1921 | Fed. Rep. of Germany | 119/70 |
| 0779716 | 7/1957 | United Kingdom | 119/18 |

Primary Examiner—Robert P. Swiatek
Assistant Examiner—Todd E. Monahan
Attorney, Agent, or Firm—John H. Crozier

[57] ABSTRACT

In a preferred embodiment, a bird feed having a center post upon the lower end of which is disposed a first, circular, horizontal plate. A toroidally shaped pastry item such as a doughnut or a bagel, or a suet cake, or like food item is placed on the first plate with the post inserted in the hole of the doughnut. Then, a second, circular, horizontal plate, having a diameter larger than the first plate is placed over the doughnut to hold the doughnut in place and to provide weather protection. The feeder can be hung from a tree branch or other convenient support. The doughnut is protected from rain and snow and the entire doughnut cannot be pulled from the feeder by a bird.

6 Claims, 1 Drawing Sheet

BIRD FEEDER

BACKGROUND OF THE INVENTION

1. Field of the Invention

The present invention relates generally to bird feeders and, more particularly, to a novel bird feeder that shelters the bird food from rain and snow, keeps the food from being blown away by wind, prevents the food from being pulled off the feeder, and is especially useful when the food is in the form of a doughnut or the like.

2. Background Art

Bird feeders are well known and comprise a myriad of forms. In its simplest form, a bird feeder may be a raised horizontal surface on which food is placed. In a more advanced form, a roof may be provided over the horizontal surface. In other cases, especially when loose seed is the food, the food may be placed in a vertical cylinder having an opening at the bottom for the seed to exit.

While each of the known bird feeders is satisfactory in one or more respects, many suffer from the disadvantage that the food is not adequately protected from rain and snow. Additionally, most suffer from the disadvantage that the food may be blown away by wind. The latter disadvantage is true even with the cylindrical type of bird feeder, as the seed can be blown away after it exits the cylinder. In most cases when feeding a rather large item, such as a doughnut or the like, there is the likelihood that a bird will pull the item from the feeder so that it drops to the ground where birds continue to consume it. This is extremely undesirable, since the principal reason for having an elevated bird feeder is to keep the birds away from ground-based predators. None of the known bird feeders is especially adapted for feeding birds such items as doughnuts, some of the feeders, such as the cylindrical type, being unsuitable for handling a doughnut, or the feeders not preventing pulling the doughnut from the feeder, or not offering sufficient weather protection for the easily disintegrated doughnut.

Accordingly, it is a principal object of the present invention to provide a bird feeder that is especially useful for feeding a doughnut or the like.

It is another object of the invention to provide such a bird feeder that provides weather protection for the food.

It is an additional object of the invention to provide such a bird feeder that prevents the doughnut or the like from be pulled therefrom.

It is a further object of the invention to provide such a bird feeder that can be easily and economically constructed.

Other objects of the present invention, as well as particular features and advantages thereof, will be elucidated in, or be apparent from, the following description and the accompanying drawing figures.

SUMMARY OF THE INVENTION

The present invention achieves the above objects, among others, by providing, in a preferred embodiment, a bird feed having a center post upon the lower end of which is disposed a first, circular, horizontal plate. A toroidally shaped pastry such as a doughnut or a bagel, or a suet cake, or like food item is placed on the first plate with the post inserted in the hole of the doughnut. Then, a second, circular, horizontal plate, having a diameter larger than the first plate is placed over the doughnut to hold the doughnut in place and to provide weather protection. The feeder can be hung from a tree branch or other convenient support. The doughnut is protected from rain and snow and the entire doughnut cannot be pulled from the feeder by a bird.

BRIEF DESCRIPTION OF THE DRAWING

Understanding of the present invention and the various aspects thereof will be facilitated by reference to the accompanying drawing figures, in which.

DETAILED DESCRIPTION OF THE PREFERRED EMBODIMENTS

Figure 1:
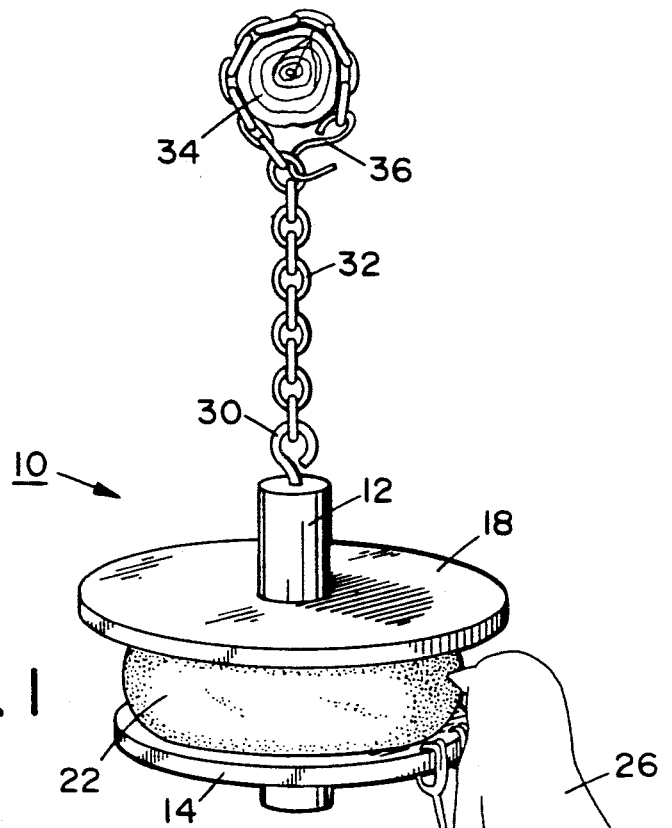
FIG. 1 is a top/side perspective view of a bird feeder according to the present invention with a doughnut placed therein and a bird feeding on the doughnut.

Referring now to the Drawings, in which the same elements are given consistent identifying numerals throughout the figures thereof, there is shown a bird feeder constructed according to the present invention, generally indicated by the reference numeral 10.

Figure 2:
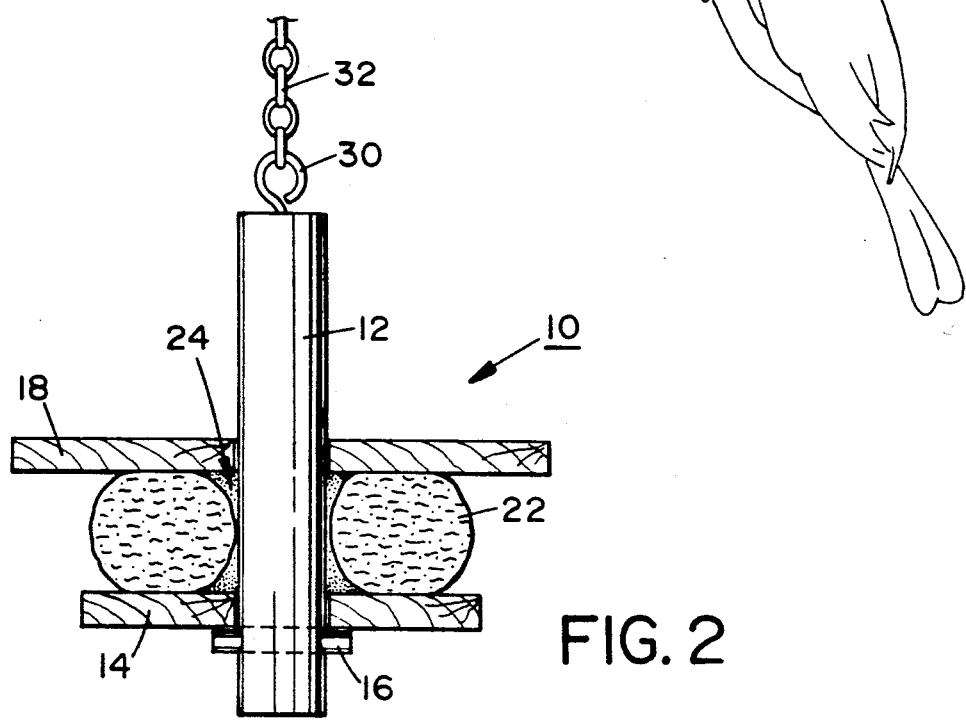
FIG. 2 is a side elevational view, partially in cross-section, of the bird feeder of FIG. 1.

Bird feeder 10 includes a central, circular, vertical post 12 at the lower end of which is disposed a lower, circular, horizontal plate 14 secured against downward movement by a dowel 16 inserted horizontally through post 12 and frictionally held therein. Spaced vertically on post 12 from lower plate 14 is an upper, circular, horizontal plate 18, having a diameter somewhat greater than the diameter of the lower plate. Disposed between lower plate 14 and upper plate 18 is a doughnut 22, with post 12 extending through the doughnut hole 24 (FIG. 2). A bird 26 (FIG. 1) is shown feeding on doughnut 22.

A screw hook 30 is threadedly advanced into the top of post 12 has one end of a chain 32 attached thereto, with the other end of the chain being looped over a tree branch 34 and secured to itself by means of an S-hook 36. Other means of supporting bird feeder 10 are also within the intent of the present invention. For example, a nylon cord rather than chain 32 may be used to suspend bird feeder 10 above the ground, or the bird feeder may be mounted on a post, or even placed on a flat surface; although, with the latter two alternatives, some means of preventing access by predators must be provided also.

To insert doughnut 22 in bird feeder 10, chain 32 is disengaged from screw hook 30, upper plate 18 removed, and a doughnut placed on lower plate 14. Then, upper plate 18 is replaced and chain 32 is re-engaged by screw hook 30.

Having upper plate 18 of greater diameter than lower plate 14 affords weather protection for doughnut 22. Having post 12 inserted through doughnut hole 24 secures doughnut 22 from being pulled from bird feeder 10. While doughnut 22 is shown as being the food, it will be understood that other food items, such as bagels or specially formed suet cakes, could be used with bird feeder 10. Also, it is not necessary that the food item normally have a hole through it. For example, one or more slices of bread could be inserted in bird feeder 10 by forcing the bread over post 12 so that a hole is torn in center of the bread.

The major elements of bird feeder 10 may be constructed of any suitable materials and may be easily constructed of wood by conventional techniques. They may also be injection molded thermoplastic parts. Chain 32 and hooks 30 and 36 may be of metal.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. In combination, a toroidally shaped pastry and a bird feeder suitable for securing therein said toroidally shaped pastry, said bird feeder comprising:
   (a) a central, cylindrical, vertical post dimensioned to fit inside the hole of said toroidally shaped pastry;
   (b) a first horizontal plate, through which said cylindrical, vertical post passes, attached to said cylindrical, vertical post and upon which first horizontal plate said toroidally shaped pastry is disposed;
   (c) a peg inserted horizontally through a channel defined through said cylindrical, vertical post adjacent a lower end of said vertical post, said first horizontal plate resting upon said peg and supported vertically on said cylindrical, vertical post;
   (d) a second horizontal plate disposed against the top of said toroidally shaped pastry to hold said toroidally shaped pastry against the upper surface of said first horizontal plate; and
   (e) means attached to the top of said cylindrical, vertical post to suspend said bird feeder in an elevated position with respect to an underlying surface.

2. A bird feeder, as defined in claim 1, wherein said first horizontal plate is circular and has a diameter at least as greater as the diameter of said toroidally shaped pastry.

3. A bird feeder, as defined in claim 1, wherein said second horizontal plate is circular and has a diameter greater than the diameter of said toroidally shaped pastry.

4. In combination, a toroidally shaped pastry and a bird feeder suitable for securing therein said toroidally shaped pastry, comprising:
   (a) a cylindrical, vertical post having a diameter equal to or less than the diameter of the hole of said toroidally shaped pastry;
   (b) a first horizontal circular plate fixed to the lower end of said cylindrical, vertical post;
   (c) a peg inserted horizontally through a channel defined through said cylindrical, vertical post adjacent the a lower end of said vertical post, said first horizontal plate resting upon said peg and supported vertically on said cylindrical, vertical post;
   (d) a second horizontal circular plate, having defined centrally thereof a hole through which said cylindrical, vertical post passes, and adapted to be spaced apart vertically from said first plate a distance approximately equal to the thickness of said toroidally shaped pastry to hold said toroidally shaped pastry against the upper surface of said first horizontal cylindrical plate; and
   (e) means attached to the top of said cylindrical, vertical post to suspend said bird feeder in an elevated position with respect to an underlying surface.

5. A bird feeder, as defined in claim 4, wherein said first circular plate has a diameter at least as great as the diameter of said toroidally shaped pastry.

6. A bird feeder, as defined in claim 5, wherein said second circular plate has a diameter greater than the diameter of said first circular plate.

* * * * *